(12) United States Patent
Chae

(10) Patent No.: US 10,342,056 B2
(45) Date of Patent: Jul. 2, 2019

(54) METHOD AND DEVICE WHEREBY DEVICE-TO-DEVICE TERMINAL TRANSMITS DISCOVERY SIGNAL IN WIRELESS COMMUNICATION SYSTEM

(71) Applicant: LG ELECTRONICS INC., Seoul (KR)

(72) Inventor: Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/513,766

(22) PCT Filed: Sep. 23, 2015

(86) PCT No.: PCT/KR2015/010021
§ 371 (c)(1),
(2) Date: Mar. 23, 2017

(87) PCT Pub. No.: WO2016/048037
PCT Pub. Date: Mar. 31, 2016

(65) Prior Publication Data
US 2017/0295603 A1   Oct. 12, 2017

Related U.S. Application Data

(60) Provisional application No. 62/053,827, filed on Sep. 23, 2014.

(51) Int. Cl.
*H04L 5/00* (2006.01)
*H04W 8/00* (2009.01)
(Continued)

(52) U.S. Cl.
CPC ....... *H04W 76/14* (2018.02); *H04W 72/0406* (2013.01); *H04L 5/003* (2013.01); *H04L 5/0053* (2013.01); *H04W 8/005* (2013.01)

(58) Field of Classification Search
CPC . H04W 74/14; H04W 72/0406; H04W 8/005; H04L 5/003
See application file for complete search history.

(56) References Cited

U.S. PATENT DOCUMENTS 9,801,199 B2 *  10/2017  Wu ................... H04W 72/1215
9,942,742 B2 *   4/2018  Yang .................... H04W 8/005
(Continued)

FOREIGN PATENT DOCUMENTS

WO    WO 2014/113537 A1    7/2014

OTHER PUBLICATIONS

Alcatel-Lucent Shanghai Bell et al., "D2D discovery channel resource allocation," 3GPP TSG RAN WG1 Meeting #76, R1-140176, Prague, Czech Republic, Feb. 10-14, 2014, 7 pages.
(Continued)

*Primary Examiner* — Jeffrey M Rutkowski
*Assistant Examiner* — Jasper Kwoh
(74) *Attorney, Agent, or Firm* — Birch, Stewart, Kolasch & Birch, LLP

(57) ABSTRACT

One embodiment of the present invention relates to a method whereby a device-to-device (D2D) terminal transmits a discovery signal in a wireless communication system, the discovery signal transmission method comprising the steps of: determining the size of a subperiod in a discovery period on the basis of a buffer size; and repeatedly transmitting the discovery signal in the subperiod corresponding to the determined size by using a hopping pattern applicable to the discovery period.

9 Claims, 10 Drawing Sheets

(51) Int. Cl.
*H04W 72/04* (2009.01)
*H04W 76/14* (2018.01)

(56) References Cited

U.S. PATENT DOCUMENTS

| | | | |
|---|---|---|---|
| 10,070,438 B2* | 9/2018 | Fu | H04L 1/1822 |
| 2013/0110521 A1* | 5/2013 | Hwang | H04W 52/028 |
| | | | 704/500 |
| 2014/0204898 A1 | 7/2014 | Yang et al. | |
| 2015/0009910 A1* | 1/2015 | Ryu | H04W 72/04 |
| | | | 370/329 |
| 2015/0264551 A1* | 9/2015 | Ko | H04W 76/14 |
| | | | 370/329 |
| 2015/0289141 A1* | 10/2015 | Ghasemzadeh | H04W 16/14 |
| | | | 370/330 |
| 2015/0312960 A1* | 10/2015 | Kim | H04W 72/04 |
| | | | 370/329 |
| 2015/0327315 A1* | 11/2015 | Xue | H04L 5/0044 |
| | | | 370/330 |
| 2016/0183076 A1* | 6/2016 | Bagayoko | H04W 72/1289 |
| | | | 370/329 |
| 2016/0323868 A1* | 11/2016 | Kalhan | H04W 72/1278 |
| 2016/0345297 A1* | 11/2016 | Chen | H04W 72/02 |
| 2017/0013437 A1* | 1/2017 | Harada | H04W 8/005 |
| 2017/0134935 A1* | 5/2017 | Wei | H04W 76/14 |
| 2017/0230816 A1* | 8/2017 | Chatterjee | H04W 8/005 |

OTHER PUBLICATIONS

Alcatel-Lucent Shanghai Bell et al., "D2D discovery performance," 3GPP TSG RAN WG1 Meeting #74, R1-132996, Barcelona, Spain, Aug. 19-23, 2013, 6 pages.

Huawei et al., "D2D discovery signal design," 3GPP TSG RAN WG1 Meeting #78, R1-142980, Dresden, Germany, Aug. 18-22, 2014, 3 pages.

* cited by examiner

Sub-period lengh=discovery period length / # of repetitions

Sub-period length depending on UE buffer size

FIG. 10
(a) 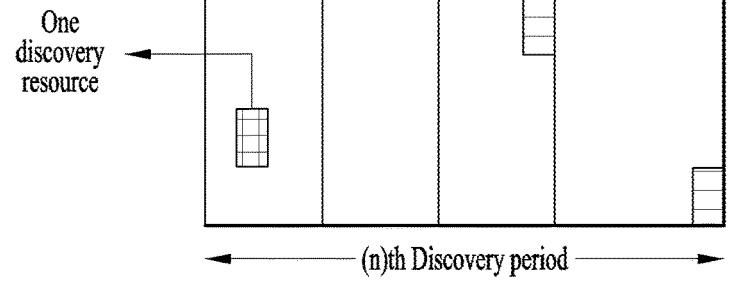
(b) 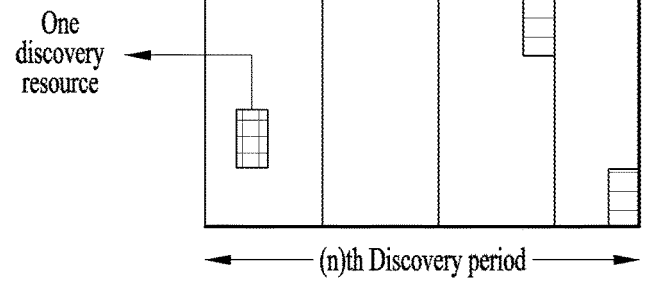
(c) 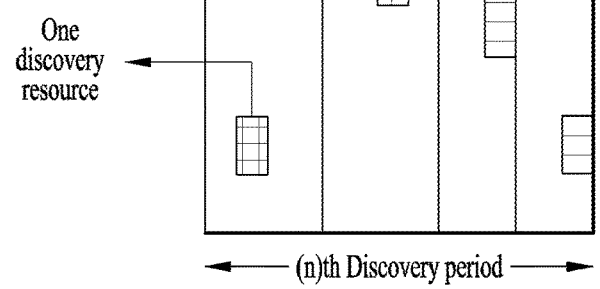

METHOD AND DEVICE WHEREBY DEVICE-TO-DEVICE TERMINAL TRANSMITS DISCOVERY SIGNAL IN WIRELESS COMMUNICATION SYSTEM

CROSS REFERENCE TO RELATED APPLICATIONS

This application is the National Phase of PCT International Application No. PCT/KR2015/010021, filed on Sep. 23, 2015, which claims priority under 35 U.S.C. 119(e) to U.S. Provisional Application No. 62/053,827, filed on Sep. 23, 2014, all of which are hereby expressly incorporated by reference into the present application.

TECHNICAL FIELD

Following description relates to a wireless communication system, and more particularly, to a method of transmitting a discovery signal in device-to-device communication and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that with the introduction of D2D communication will reduce the power consumption of devices participating in D2D communication, increase data transmission rates, increase the accommodation capability of a network, distribute load, and extend cell coverage.

DISCLOSURE OF THE INVENTION

Technical Task

A technical task of the present invention is to perform processing related to a hopping method when a signal is repeatedly transmitted in a discovery period.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting a discovery signal, which is transmitted by a D2D (device-to-device) user equipment (UE) in a wireless communication system, includes the steps of determining a size of a sub-period based on a buffer size in a discovery period, and repeatedly transmitting a discovery signal in a sub-period corresponding to the determined size using a hopping pattern applied to the discovery period.

To further achieve these and other advantages and in accordance with the purpose of the present invention, according to a different embodiment, a user equipment transmitting a D2D (device-to-device) signal in a wireless communication system includes a transmitter and a receiver, and a processor, the processor configured to determine a size of a sub-period based on a buffer size in a discovery period, the processor configured to repeatedly transmit a discovery signal in a sub-period corresponding to the determined size using a hopping pattern applied to the discovery period.

The size of the sub-period can be pre-configured in consideration of a buffer size of the UE.

If a size of the discovery period is not a multiple of the sub-period size, a size of the last sub-period included in the discovery period can be different from sizes of sub-periods except the last sub-period.

The size of the sub-period may correspond to a value smaller than the buffer size of the UE receiving the discovery signal.

The size of the sub-period can be determined to minimize the number of subframes not included in any sub-period in the discovery period.

The size of the sub-period can be determined by an equation in the following.

$$M' = \underset{M, s.t. 1 \leq M \leq N_{buffer}}{\arg\min} \left( N_p - m \cdot M \cdot \left\lfloor \frac{N_p}{m \cdot M} \right\rfloor \right).$$

In this case, $N_{buffer}$ corresponds to the number of subframes stored in the buffer, M corresponds to a size of a sub-period, M' corresponds to a size of the determined sub-period, m corresponds to the number of repetition of the discovery signal, and $N^p$ may correspond to the number of subframes contained in a discovery period.

The size of the sub-period may correspond to a value smaller than the buffer size of the UE receiving the discovery signal.

The hopping pattern applied to the discovery period can be determined by an equation in the following. next_nt= (t_shift+nf+Nf*nt) mod Nt, next_nf=(f_shift+floor((nf+ Nf*nt)/Nt)) mod Nf. In this case, the next_nf and the next_nt respectively correspond to a frequency resource index and a time resource index at which a discovery signal is transmitted in a next discovery period, the Nt corresponds to the number of subframes per discovery period, the f_shift corresponds to a frequency shift, the t_shift corresponds to a subframe shift, the nf corresponds to a frequency resource index at which the discovery signal is transmitted, and the nt may corresponds to a time resource index at which the discovery signal is transmitted.

If the hopping pattern applied to the discovery period is used for the sub-period, the Nt may correspond to the determined size of the sub-period.

The hopping pattern applied to the discovery period can be determined by an equation in the following. next_nf=(nf+f_shift) modulo Nf, next_nt=(nt+nf+f(nt)+t_shift) modulo Nt. In this case, the next_nf and the next_nt respectively correspond to a frequency resource index and a time resource index at which a discovery signal is transmitted in a next discovery period, the Nt corresponds to the number of subframes per discovery period, the f_shift corresponds to a frequency shift, the t_shift corresponds to a subframe shift, the nf corresponds to a frequency resource index at which the discovery signal is transmitted, and the nt may correspond to a time resource index at which the discovery signal is transmitted.

If the hopping pattern applied to the discovery period is used for the sub-period, the Nt may correspond to the determined size of the sub-period.

Advantageous Effects

According to embodiments of the present invention, it is able to use hopping within a discovery period while solving a problem of excessive buffering of a terminal.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIGS. 7 to 11 are diagrams for explaining a method of configuring a sub-period according to embodiments of the present invention;

BEST MODE

Mode for Invention

Figure 1:
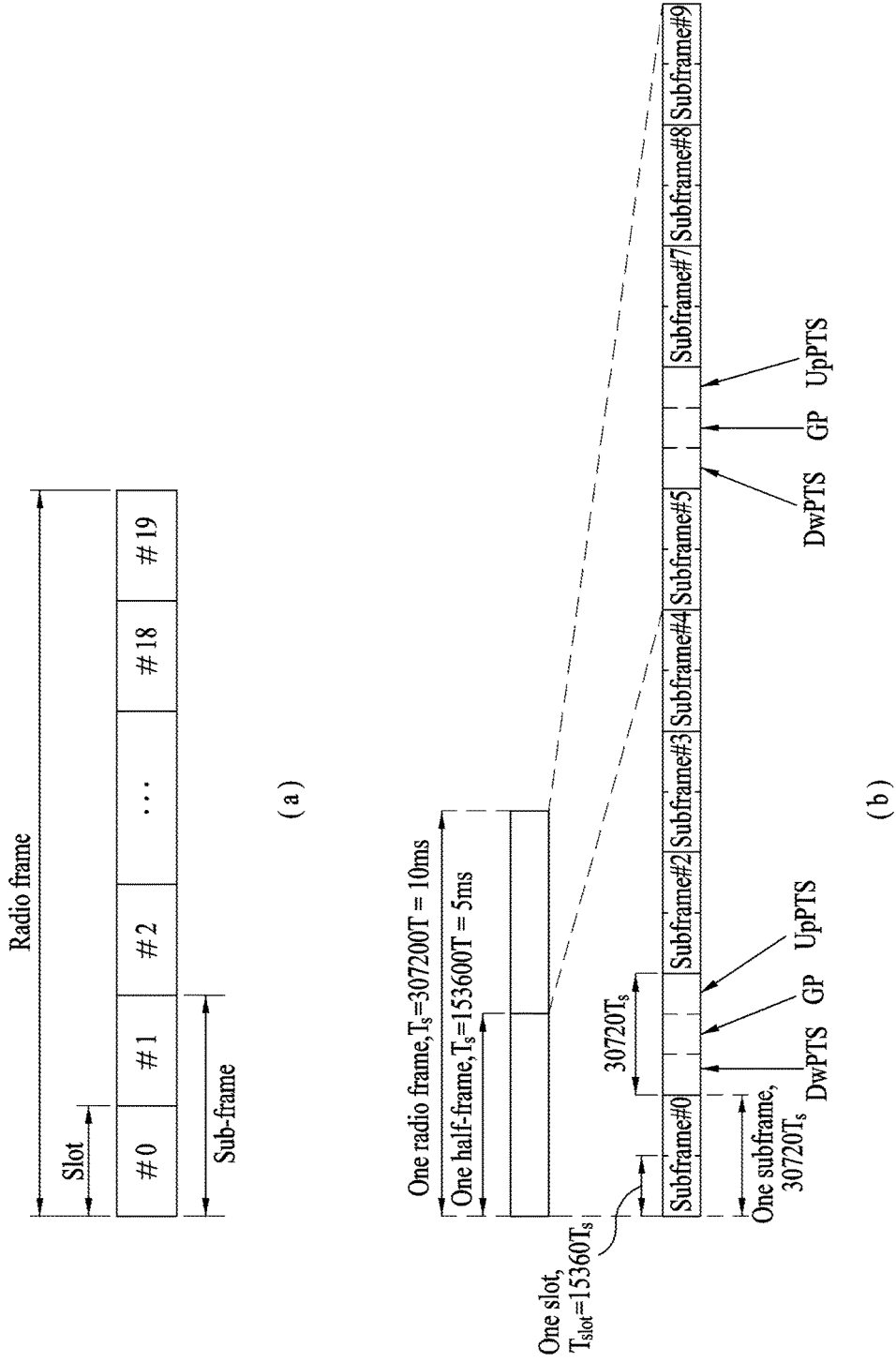
FIG. 1 is a diagram for a structure of a radio frame.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "a mobile station (MS)," "mobile subscriber station (MSS)" and "subscriber station (SS)". A base station can be used as a meaning indicating a scheduling node, a cluster head, and the like. If a base station or a relay transmits a signal transmitted by a terminal, the base station or the relay can be regarded as a terminal.

In the following, such a term as a cell is applied to such a transmission/reception point as a base station (eNB), a sector, a remote radio head (RRH), and the like. The cell can be used as a comprehensive term to identify a component carrier in a specific transmission/reception point.

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

LTE/LTE-A Resource Structure/Channel

Hereinafter, a radio frame structure will be described with reference to FIG. 1.

In a cellular OFDM wireless packet communication system, an uplink (UL)/downlink (DL) data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

Figure 2:
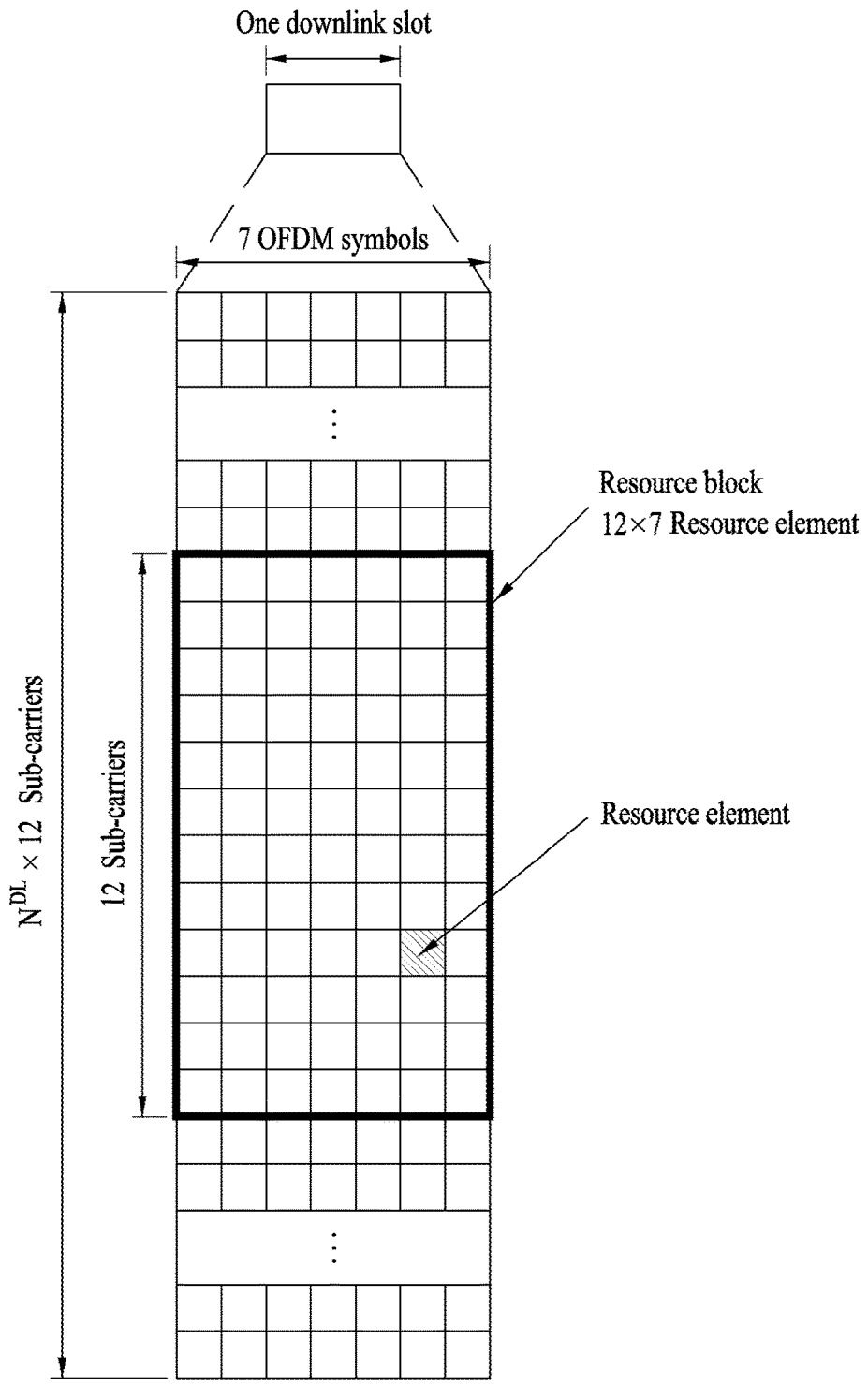
FIG. 2 is a diagram for a resource grid in a downlink slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12 7 REs. The number NDL of RBs included in a downlink slot depends on a DL transmission bandwidth. A UL slot may have the same structure as a DL slot.

Figure 3:
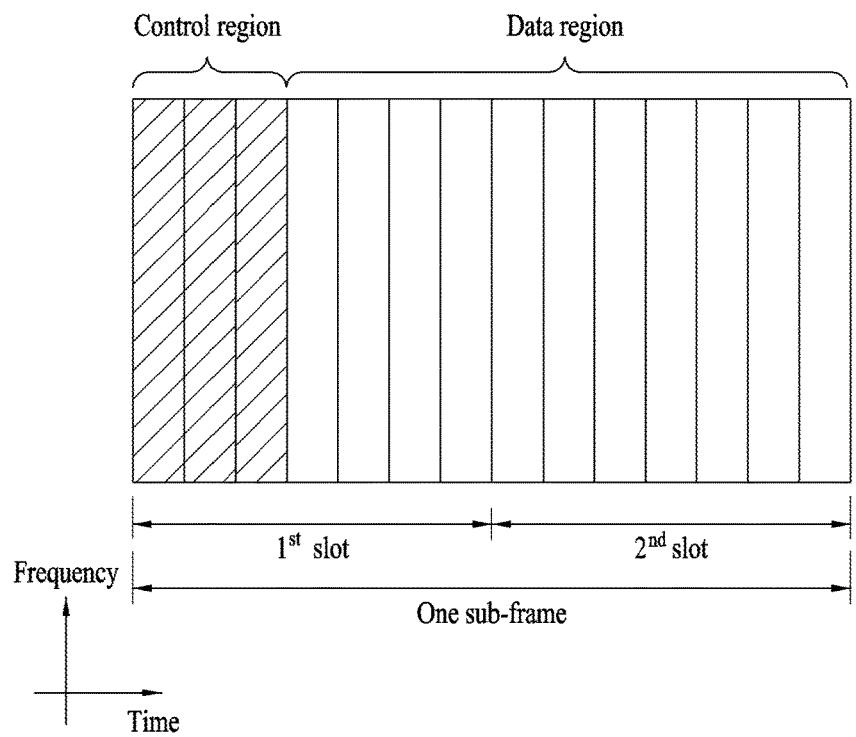
FIG. 3 is a diagram for a structure of a downlink subframe.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
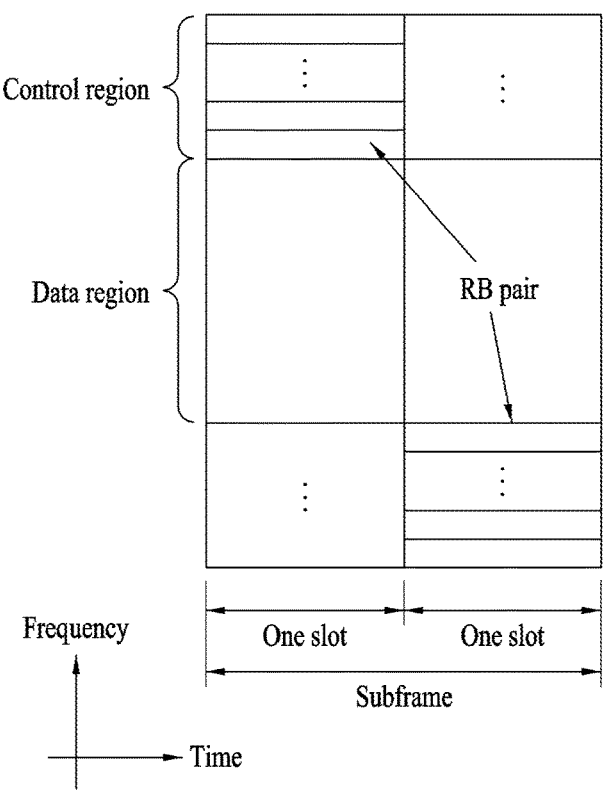
FIG. 4 is a diagram for a structure of an uplink subframe.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS), and the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 5:
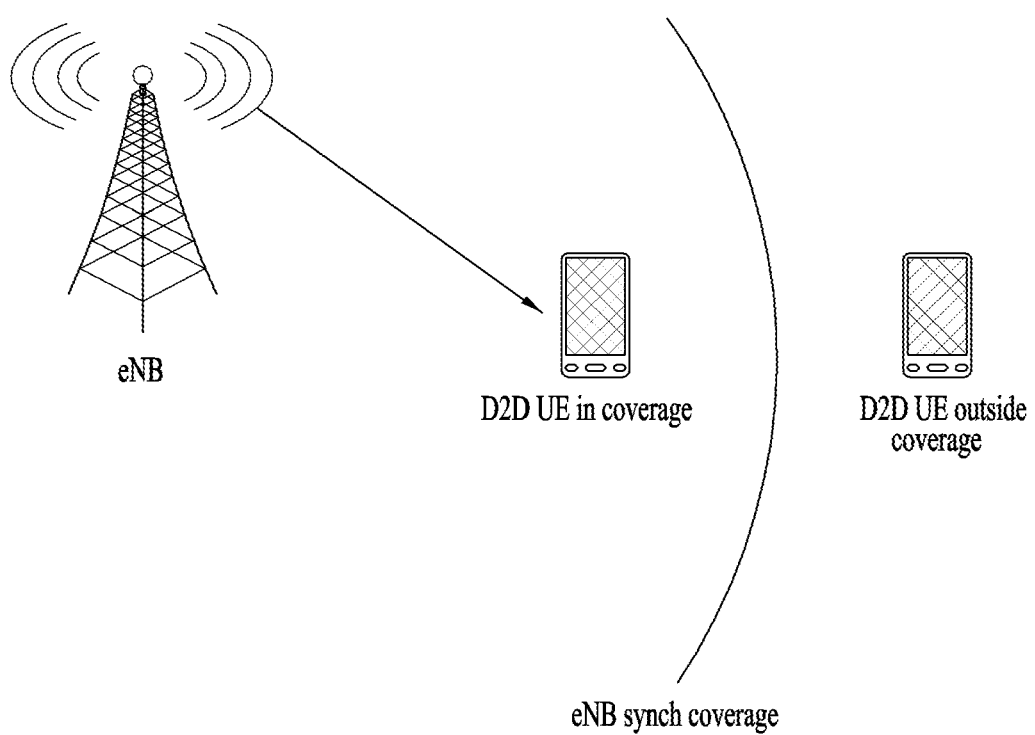
FIG. 5 is a diagram for explaining relaying of a synchronization signal.

In a situation illustrated in FIG. 5, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE. FIG. 5 illustrates an exemplary case in which a D2DSS is relayed and communication is conducted between D2D UEs based on the relayed D2DSS.

TRP

In the following, a TRP (time resource pattern) is explained when a UE transmits data, a discovery signal, and the like. The TRP can also be called as RPT (resource pattern transmission), T-RPT (time-RPT), and the like. In the following description, a scheme of indicating a location of a transmission resource indicated by an eNB/UE corresponds to a mode 1/type 2 and a scheme of indicating (selecting) a location of a transmission resource from a specific resource pool indicated (selected) by a UE corresponds to a mode 2/type 1. And, in the following description, SA (scheduling assignment) corresponds to a channel on which control information related to D2D data transmission and control information are transmitted. The SA can also be called as a PSBCH (physical broadcast channel). The SA is preferentially transmitted before data is transmitted. A D2D signal reception UE decodes the SA first and identifies a resource position at which data indicated by the SA is transmitted. Then, the D2D reception UE can receive a D2D signal in the identified resource. And, in the following description, D2D can also be called as sidelink. In the following, for clarity, it may use such a term as a TRP indication bit sequence. The bit sequence may consist of IDs included in the SA only. If an additional bit field is included in the SA to indicate the TRP, 'ID+TRP bit sequence' can be comprehended as the TRP indication bit sequence. Or, the SA may include ID and a bit sequence for indicating an independent TRP. In this case, the TRP bit sequence can be comprehended as the TRP indication bit sequence. A bit sequence set, which is transmitted in a manner of being included in the SA and used to indicate the TRP, can be comprehended as the TRP indication bit sequence.

Figure 6:
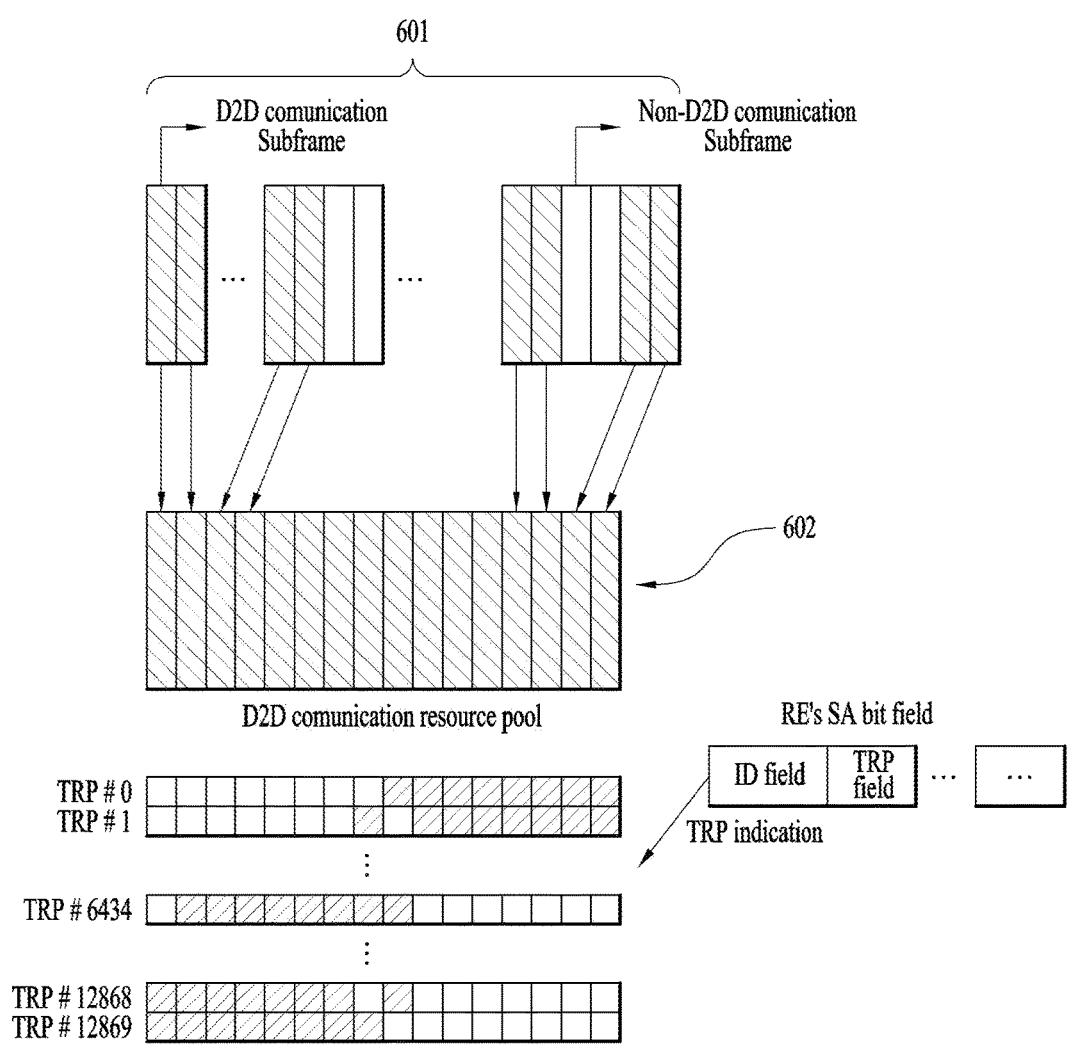
FIG. 6 is a diagram for explaining a time resource pattern according to embodiment of the present invention.

FIG. 6 illustrates TRPs according to an embodiment of the present invention. Referring to FIG. 6, a plurality of subframes 601 may include subframes available for D2D signal transmission and reception (e.g., UL subframes in TDD, and D2D communication subframes in FIG. 6) and subframes unavailable for D2D signal transmission and reception (non-D2D communication subframes in FIG. 6). The plurality of subframes 601 may be included within a D2D control information transmission period (e.g., a physical sidelink control channel). A subframe pool 602 for data transmission may be determined, which includes only D2D communication subframes from among the plurality of subframes 601.

As TRPs (TRP #0, #1, . . . ) are applied to the subframe pool 602 for data transmission, a set of subframes to transmit D2D data may be determined. For example, if TRP #1 is applied to the subframe pool 602 for data transmission, an $8^{th}$ subframe and $10^{th}$ to $16^{th}$ subframes may be included in a subframe set, for D2D data transmission. Shaded parts of the TRPs in FIG. 16 may indicate subframes that will carry D2D data. A TRP may be a bitmap having bits corresponding to the respective subframes of a subframe pool for data transmission. If a bit of the bitmap is set to 1, the bit may indicate a subframe to transmit D2D data. Specifically, if a TRP is configured to be a bitmap, the shaded parts of the TRP may be 1s and the non-shaded parts of the TRP may be 0s in FIG. 6. For example, TRP #1 is a bitmap of {0, 0, 0, 0, 0, 0, 0, 1, 0, 1, 1, 1, 1, 1, 1, 1}.

Once a subframe set is determined for transmission of D2D data, the D2D data may be transmitted in the subframe set. Upon receipt of an SA, a UE may detect and decode a D2D signal in corresponding subframes, expecting transmission of the D2D signal in the subframes.

In the above description, a Transport Block (TB) for D2D data may be transmitted in a predetermined number of subframes in a subframe set. That is, the number of repetitions/a retransmission number/the number of retransmissions may be predetermined for each TB. For example, the number of retransmissions per TB may be fixed to 4.

The above-described plurality of subframes may be contiguous subframes following D2D control information-related subframes (including UL subframes that may carry D2D control information, DL subframes with no relation to the UL subframes, and special subframes in TDD) in one D2D control information period (i.e., one SA period). The D2D control information (an SA, an MCS, resource allocation information, a TRP, etc.) may be transmitted in subframes determined to transmit D2D control information (i.e., a subframe pool (for D2D control information)) from among subframes available for transmission of D2D control information according to an SA subframe bitmap. In this case, information indicating a TRP in a subframe next to the subframe pool for D2D control information may be transmitted in the D2D control information. If one SA period is configured as described above, subframes included in a subframe pool for data transmission are not overlapped with subframes included in a subframe pool for D2D control information. More specifically, if the subframe pool for D2D control information is overlapped with the subframe pool for D2D data transmission, it may be regulated that D2D control information or D2D data is always transmitted and the D2D control information and the D2D data are not transmitted in the same subframe.

Meanwhile, the subframe pool for data transmission may not be defined separately in D2D communication mode 1. In this case, UL subframes following the subframe pool for D2D control information transmission (specifically, a subframe pool including the first subframe of a subframe bitmap for D2D control information transmission to a subframe corresponding to the last 1 of the bitmap) may be a subframe pool for implicit mode 1 D2D data transmission.

Application of TRP

In the foregoing description, a TRP may be applied to subframes as follows.

A UE may determine a subframe indicator bitmap corresponding to TRP indication information. If the UE is a D2D control information transmitter, the TRP indication information may be transmitted in D2D control information. If the UE is a D2D control information receiver, the TRP indication information may be included in received D2D control information. Herein, the TRP indication information may be described in a later-described TRP indication part or may be an index indicating a specific subframe indicator bitmap. For example, if the size of the subframe indicator bitmap is 8, there may be a set of available bitmaps. An index may be assigned to each bitmap included in the bitmap set and a subframe indicator bitmap may be determined by such as index.

A bitmap to be applied to a subframe pool for data transmission may be determined from the subframe indicator bitmap. The subframe indicator bitmap may be smaller than the subframe pool for data transmission in size. In this case, the subframe indicator bitmap (e.g., a TRP indication bit sequence) may be repeated. If the length of the TRP indication bit sequence is M, the M-bit sequence is simply repeated and filled in the remaining L subframes. If L is not a multiple of M, a TRP may be generated by sequentially filling the remaining bit sequence in the L subframes.

That is, if the subframe indicator bitmap is smaller in size than the subframe pool for data transmission, the subframe indicator bitmap may be repeated within the bitmap for the subframe pool for data transmission.

For example, if the size M of the subframe indicator bitmap is smaller than the number of subframes in the resource pool for data transmission and the UE transmits D2D data in the first subframe of the subframe pool for data transmission, the UE may transmit D2D data in a $(1+M)^{th}$ subframe of the subframe pool. Or a first bit value of the bitmap (to be applied to the subframe pool for data transmission) may be equal to a (subframe indicator bitmap size+1)$^{th}$ bit value.

If the size of the subframe pool for data transmission is not a multiple of the size of the subframe indicator bitmap, the bits of the last repeated subframe indicator bitmap may be used sequentially. In other words, if the size of the subframe pool for data transmission is not a multiple of the size of the subframe indicator bitmap, the last repeated subframe indicator bitmap may be truncated. Specifically, if the subframe indicator bitmap is 16 bits {0, 0, 0, 0, 0, 0, 0, 1, 0, 1, 1, 1, 1, 1, 1, 1} and the subframe pool includes 36 subframes, the bitmap (to be applied to a subframe pool for data transmission) is configured by repeating the subframe indicator bitmap twice and using the first 4 bits of the subframe indicator bitmap sequentially at the third repetition (while truncating the remaining bits). That is, the bitmap (to be applied to the subframe pool for data transmission) is {0, 0, 0, 0, 0, 0, 0, 1, 0, 1, 1, 1, 1, 1, 1, 1, 0, 0, 0, 0, 0, 0, 0, 1, 0, 1, 1, 1, 1, 1, 1, 1, 0, 0, 0, 0}.

Indication of TRP

Now, a description will be given of a method for indicating the above-described TRP.

First, an eNB may indicate an ID and TRP bits included and transmitted in an SA by a D2D SA grant in mode 1. The ID sequence included in the SA and/or the sequence of a TRP bit field included in the SA (a bit field indicating a specific ID and/or a TRP) may be explicitly included in the D2D SA grant. Or the ID sequence to be transmitted in the SA and/or the TRP bit field to be transmitted in the SA may be generated by hashing the bit sequence of a D2D-RNTI or using partial bits (e.g., lower N bits) of the bit sequence of the D2D-RNTI. Because an RNTI is different for each UE and at least a part of the RNTI is used, the position of D2D resources may be configured for each UE without additional signaling. A D2D-RNTI is an ID pre-signaled to distinguish D2D control information from other control information and is used for masking the CRC of the D2D control information. A part of the ID included and transmitted in the SA may be generated from the RNTI and the remaining part of the ID may be generated based on a target ID (or a group ID). Or the ID may be generated by combining (e.g., AND/XOR/OR-operating) both the RNTI and the target or group ID. The ID included and transmitted in the SA may be changed over time. Characteristically, only a Transmission (Tx) UE ID may be changed. This is because if up to a target UE ID part is hopped and a target UE is not aware of the hopping, the target UE may not detect the ID. If the target UE is aware of even a hopping pattern of the target UE ID part, every ID sequence included in the SA may be hopped in a predetermined rule. The changeability (hopping) of the ID sequence over time may be implemented by directly setting a different bit field in a D2D SA grant by the eNB and the ID sequence may be changed in a predetermined rule after the D2D SA grant of the eNB. For example, the ID sequence included in the D2D SA grant may be used as an initialization parameter for a random sequence and a time-variant sequence may be generated using a random sequence created using the initialization parameter.

Second, an ID may be transmitted in an SA and a TRP may be determined using the ID in mode 2. The ID may be a short ID induced from an ID (a transmission and/or reception (target or group) ID) by a higher layer or a bit sequence used to configure the transmission position of data and a scrambling parameter. If the ID included in the SA is too short for creation of TRP candidates, the probability of collision between IDs is increased. In this case, a plurality of Tx UEs are likely to use the same TRP. To prevent this, a part of the bits of the SA may include bits indicating a TRP. Also, a specific TRP may be indicated by combining an ID bit field and bits of a TRP field in the SA. For example, the ID included in the SA may be used to indicate a TRP set and TRP indication bits included in the SA may indicate a specific index within the TRP set. In another example, the TRP bits included in the SA may indicate a specific TRP set within a resource pool and the ID included in the SA may indicate a specific TRP within the pool/set indicated by the TRP bits. In this case, the bits indicating a TRP set may be transmitted semi-statically without being transmitted in every SA. For example, the bits indicating a TRP set may be used as a virtual CRC on the assumption that the bits are transmitted in every $n^{th}$ SA or even though the bits are transmitted in every SA, they are not changed over n SA transmissions. Meanwhile, these TRP bits are not included additionally. Rather, the TRP bits may be transmitted by borrowing an unused state of MCS bits or any other SA bit field. Or a TRP pattern may be indicated by using all unused states of additionally included bits and other bit fields.

Meanwhile, the size of TRP bits used in an indication of an SA may be changed according to the size of a D2D UE group or the number of Tx UEs in the group. For example, if a specific police officer group includes N police officers, the number of TRP indication bits is set to log 2(N). Herein, the remaining unused bits may be used for other purposes or may be set to 0s for use as a virtual CRC.

Meanwhile, an ID may be set differently for a TRP in mode 1 and mode 2. For example, while a TRP may be indicated using only a Tx UE ID in mode 1, a TRP may be indicated using both a Tx UE ID and a target UE ID (group ID) in mode 2.

To configure a TRP, the following information may be used: i) information about the size of a transmission opportunity from the viewpoint of a UE (this information indicates how many resources are allocated to one UE by one SA); and ii) information about the number of retransmissions for each TB (this information may be information about the number of TBs transmitted during one SA period. In this case, the number of retransmissions for each TB may be calculated by flooring the size (number) of transmission opportunities during one SA period/the number of TBs transmitted by one SA. Or this information may be information about the (maximum) number of repetitions for each TB). Part of the information may be preset or configured by the network. The information may be preset for an out-of-coverage UE or signaled to the out-of-coverage UE from another UE within the network by a physical-layer signal or a higher-layer signal. In addition, part of the information may be included and transmitted in an SA. For example, the transmission opportunity size may be preset or configured by the network. Herein, a retransmission number for each TB may be included and transmitted in the SA. On the other hand, information about the transmission opportunity size may be included and transmitted in the SA and information about the retransmission number may be preset or semi-statically indicated in a higher-layer signal by the network.

In a specific example, if an SA includes an 8-bit ID, the number of TRPs distinguishable by IDs is 256 (=$2^8$). If a mode-2 resource pool includes 16 subframes and a transmission opportunity size is 8, the number of TRPs that can be generated is 12870 (=16C8). Therefore, it is impossible to identify a TRP only by the ID bits included in the SA. To avoid this problem, additional bits may be included in the SA in order to indicate a TRP in the above-described method. In this case, about 6 additional bits are needed to distinguish all TRPs that can be produced. The additional bits may be available from a combination of unused MCS states and a new bit field or from an additional bit field.

Signaling of TRP Subset

The network may signal a TRP subset configuration by a higher-layer signal (e.g., an RRC signal). More specifically, a UE may determine a bitmap for application to a subframe pool for data transmission using TRP indication information and transmit D2D data in subframes indicated by the bitmap, as described before. In the case where an RRC Information Element (IE) related to a TRP subset is configured for the UE, if the UE is not related to the RRC IE related to a TRP subset, a set of bitmaps that can be indicated by the TRP indication information may be a subset of a bitmap set that can be indicated by the TRP indication information. Herein, the TRP indication information is an index indicating one bit map in a bitmap set.

The above description will be detailed with reference to [Table 1] below. [Table 1] defines a relationship between TRP indication information $I_{TRP}$ and a bitmap corresponding to the TRP indication information $I_{TRP}$, under the condition that the size of a TRP-related subframe indicator bitmap is 6. For example, if the TRP indication information $I_{TRP}$ is 22, the subframe indicator bitmap is {0, 1, 1, 0, 1, 0}.

TABLE 1

| $I_{TRP}$ | $k_{TRP}$ | $b_0', b_1', \ldots b_{N_{TRP}-1}'$ |
|---|---|---|
| 0 | reserved | reserved |
| 1 | 1 | (1, 0, 0, 0, 0, 0) |
| 2 | 1 | (0, 1, 0, 0, 0, 0) |
| 3 | 2 | (1, 1, 0, 0, 0, 0) |
| 4 | 1 | (0, 0, 1, 0, 0, 0) |
| 5 | 2 | (1, 0, 1, 0, 0, 0) |
| 6 | 2 | (0, 1, 1, 0, 0, 0) |
| 7 | 3 | (1, 1, 1, 0, 0, 0) |
| 8 | 1 | (0, 0, 0, 1, 0, 0) |
| 9 | 2 | (1, 0, 0, 1, 0, 0) |
| 10 | 2 | (0, 1, 0, 1, 0, 0) |
| 11 | 3 | (1, 1, 0, 1, 0, 0) |
| 12 | 2 | (0, 0, 1, 1, 0, 0) |
| 13 | 3 | (1, 0, 1, 1, 0, 0) |
| 14 | 3 | (0, 1, 1, 1, 0, 0) |
| 15 | 4 | (1, 1, 1, 1, 0, 0) |
| 16 | 1 | (0, 0, 0, 0, 1, 0) |
| 17 | 2 | (1, 0, 0, 0, 1, 0) |
| 18 | 2 | (0, 1, 0, 0, 1, 0) |
| 19 | 3 | (1, 1, 0, 0, 1, 0) |
| 20 | 2 | (0, 0, 1, 0, 1, 0) |
| 21 | 3 | (1, 0, 1, 0, 1, 0) |

TABLE 1-continued

| $I_{TRP}$ | $k_{TRP}$ | $(b_0', b_1', \ldots b_{N_{TRP}-1}')$ |
|---|---|---|
| 22 | 3 | (0, 1, 1, 0, 1, 0) |
| 23 | 4 | (1, 1, 1, 0, 1, 0) |
| 24 | 2 | (0, 0, 0, 1, 1, 0) |
| 25 | 3 | (1, 0, 0, 1, 1, 0) |
| 26 | 3 | (0, 1, 0, 1, 1, 0) |
| 27 | 4 | (1, 1, 0, 1, 1, 0) |
| 28 | 3 | (0, 0, 1, 1, 1, 0) |
| 29 | 4 | (1, 0, 1, 1, 1, 0) |
| 30 | 4 | (0, 1, 1, 1, 1, 0) |
| 31 | 5 | (1, 1, 1, 1, 1, 0) |
| 32 | 1 | (0, 0, 0, 0, 0, 1) |
| 33 | 2 | (1, 0, 0, 0, 0, 1) |
| 34 | 2 | (0, 1, 0, 0, 0, 1) |
| 35 | 3 | (1, 1, 0, 0, 0, 1) |
| 36 | 2 | (0, 0, 1, 0, 0, 1) |
| 37 | 3 | (1, 0, 1, 0, 0, 1) |
| 38 | 3 | (0, 1, 1, 0, 0, 1) |
| 39 | 4 | (1, 1, 1, 0, 0, 1) |
| 40 | 2 | (0, 0, 0, 1, 0, 1) |
| 41 | 3 | (1, 0, 0, 1, 0, 1) |
| 42 | 3 | (0, 1, 0, 1, 0, 1) |
| 43 | 4 | (1, 1, 0, 1, 0, 1) |
| 44 | 3 | (0, 0, 1, 1, 0, 1) |
| 45 | 4 | (1, 0, 1, 1, 0, 1) |
| 46 | 4 | (0, 1, 1, 1, 0, 1) |
| 47 | 5 | (1, 1, 1, 1, 0, 1) |
| 48 | 2 | (0, 0, 0, 0, 1, 1) |
| 49 | 3 | (1, 0, 0, 0, 1, 1) |
| 50 | 3 | (0, 1, 0, 0, 1, 1) |
| 51 | 4 | (1, 1, 0, 0, 1, 1) |
| 52 | 3 | (0, 0, 1, 0, 1, 1) |
| 53 | 4 | (1, 0, 1, 0, 1, 1) |
| 54 | 4 | (0, 1, 1, 0, 1, 1) |
| 55 | 5 | (1, 1, 1, 0, 1, 1) |
| 56 | 3 | (0, 0, 0, 1, 1, 1) |
| 57 | 4 | (1, 0, 0, 1, 1, 1) |
| 58 | 4 | (0, 1, 0, 1, 1, 1) |
| 59 | 5 | (1, 1, 0, 1, 1, 1) |
| 60 | 4 | (0, 0, 1, 1, 1, 1) |
| 61 | 5 | (1, 0, 1, 1, 1, 1) |
| 62 | 5 | (0, 1, 1, 1, 1, 1) |
| 63 | 6 | (1, 1, 1, 1, 1, 1) |
| 64-127 | reserved | reserved |

The above [Table 1] may be referred to as a mother bitmap set that is available, if there is no specific RRC signaling. In this case, an RRC IE related to a TRP subset may be configured for a UE. The RRC IE related to a TRP subset may impose a restriction on an index-based available set. For example, if $k_{TRP}$ available to the UE is 4 at maximum in [Table 1] and the TRP subset-related RRC IE is {1, 1, 1, 0}, a set of bitmaps corresponding to $k_{TRP}$ values of 1, 2, and 3 may be a subset of the mother bitmap set. That is, in the case where a TRP subset-related IE is configured by RRC signaling, if the UE is not related to the TRP set-related RRC IE (if the RRC IE is not signaled or if the RRC IE is signaled but not configured), a set of bitmaps available to the UE or a set of TRP indication information may be a subset of a set of bitmaps or TRP indication information.

The TRP subset-related RRC IE may be for a mode-2 UE.

Restricting a TRP subset by the network may be effective especially when a UE determines transmission resources as in mode 2. In the case where the UE selects a TRP index randomly, if there are a small number of neighbor UEs and thus interference is not severe, the UE may transmit a packet faster by selecting a large $k_{TRP}$ value. On the other hand, if there are a large number of neighbor UEs and thus interference is severe, the UE may be limited to a relatively small $k_{TRP}$ value through a subset to solve inband emission and half duplexing. Consequently, the specific UE may be prevented from causing severe interference continuously.

Meanwhile, although a TRP subset may be restricted by restricting $k_{TRP}$ values, it may be restricted by restricting specific TRP indexes. For example, use of a specific $I_{TRP}$ set may be signaled to a specific UE or UE group. Despite a requirement for more signaling bits than in the case of restricting a subset by signaling a $k_{TRP}$ value, this method enables more flexible TRP subset restriction. Also, this method may be used to make a UE or UE group different from a specific UE or UE group use a different subframe in the time domain. For example, a TRP subset may be configured for UE group A so that UE group A may perform transmission in all or a part of the first 4 subframes of a TRP bitmap, whereas a TRP subset may be configured for UE group B so that UE group B may perform transmission in all or a part of the last 4 subframes of the TRP bitmap.

Discovery Signal and TRP

A TRP generation method including the aforementioned contents related to the TRP (including the contents related to TRP generation described on application number PCT/KR2015/004319, paragraphs [86] ~[245]) can also be applied to a case that a discovery signal is transmitted under the direction of an eNB. Type 1 discovery corresponds to a scheme that an eNB or a specific scheduling node (if a UE has a corresponding function, the UE may correspond to a scheduling node) configures a resource pool and a discovery signal transmission UE selects one or more resources from the configured resource pool and transmits a discovery signal. On the other hand, according to type 2 discovery, an eNB or a specific scheduling node (if a UE has a corresponding function, the UE may correspond to a scheduling node) indicates a discovery transmission resource for a specific UE. In this case, it may individually indicate a discovery transmission resource in every discovery transmission or indicate a plurality of discovery signal transmission resources at one indication. If an eNB or a scheduling node individually indicates a discovery signal transmission resource, it can be called as a type 2a. If the eNB or the scheduling node indicates a plurality of discovery signal transmission resources, it can be called as a type 2B. In case of the type 2, when the same eNB schedules UEs different from each other, since the eNB is able to configure the UEs to use a different resource, resource collision does not occur between the UEs. On the contrary, in case of the type 1, since a resource is selected by UEs, UEs different from each other may select the same resource and resource collision may occur. In case of the type 2B, it may be preferable to configure an eNB to transmit a discovery signal from a different position between UEs. This is because, if a plurality of discovery signal transmission UEs transmit a discovery signal at the same time, a plurality of the discovery signal transmission UEs are unable to receive (listen) a signal at the same time. As a result, the UEs are unable to discover the UEs with each other. This problem can be referred to as a half-duplex constraint. In order to solve the half-duplex constraint, it is preferable that the eNB or the scheduling node performs transmission at different timing as far as possible.

If a resource pool for the type 2B is determined in advance and transmission timing is indicated by an eNB in each pool, it becomes a problem similar to signaling a TRP in D2D communication.

Assume that a resource pool for the type B is configured by N number of subframes and each UE transmits a discovery signal in M number of subframes during the N number of subframes. In this case, an eNB (hereinafter, all scheduling nodes are called as an eNB) can indicate a TRP of a length N to each discovery signal transmission UE. In this case, the TRP can be indicated by one of the aforementioned methods. In this case, a discovery resource pool (period) can be periodically configured and the resource pool can be signaled via SIB. In this case, the resource pool of the type 2B can be included in a resource pool of the type 1 or a separate resource pool can be configured.

When a type 2 discovery resource is configured by T number of subframes and a UE performs transmission M times in the resource, the eNB can indicate a TRP that weight corresponds to M and a length corresponds to T. A scheme of indicating a plurality of discovery signal transmissions indicated by the eNB is referred to as type 2B discovery. In this case, the T number of subframes can be generated in a manner of gathering a plurality of discovery periods or can be configured in a single discovery period. As one of the TRP generation methods, the eNB can signal a TRP index to a type 2B discovery signal transmission UE via a physical layer signal (or a higher layer signal). In this case, the TRP index can be hopped using a specific rule in every period or column permutation can be performed. In this case, a permutation rule can be interlocked by a specific ID or a combination of specific ID among a physical cell ID, a virtual cell ID, a synchronization source ID, D2D-RNTI, and a Tx UE ID. When a TRP set is generated, a scheme of generating the set can be interlocked by a specific ID or a combination of specific ID among a physical cell ID, a virtual cell ID, a synchronization source ID, D2D-RNTI, and a Tx UE ID. The eNB can signal a specific TRP set and a TRP to be used among the TRP set. As mentioned above, since the TRP set is able to be interlocked with a specific ID (e.g., cell ID), it may be not necessary to have ID signaling or separate explicit signaling for designating a TRP set. Or, in order to directly indicate a specific TRP set, a specific ID can be signaled.

Meanwhile, the aforementioned cell-specific TRP generation scheme can be comprehended as a hopping pattern is different according to a cell. In this case, if a TRP is interlocked with a cell ID, it can be comprehended as a hopping pattern is different according to a cell. According to the method 8 among the contents of TRP generation described in the paragraphs [86] ~[245] of application number PCT/KR2015/004319, a position of a following resource is determined based on a first resource position. If an eNB indicates the first resource position, it may be able to determine a hopping pattern. In the following, hopping is explained in detail.

Discovery Signal Transmission and Hopping

As mentioned in the foregoing description, when a resource for transmitting a discovery signal is determined, it may use a TRP. For example, in case of TDD, a certain number of UL subframes are selected from among UL subframes included in a discovery period and a bitmap is applied to the selected UL subframes to determine a subframe pool. In this case, the subframe pool is determined by a bitmap of a length N and the bitmap of the length N can be generated by repeating a bitmap of length Nb. The Nb may correspond to a multiple of the N. Moreover, it may be able to determine a resource block pool as well. The resource block pool may correspond to a set of PRBs used for transmitting a discovery signal. The entire discovery resources in a single discovery period can be determined by the subframe pool and the resource block pool. A discovery resource can include a subframe and 2 RBs and the discovery resource can be indicated by a time resource index and a frequency resource index.

In this case, the discovery resource can hop in every period.

As a first (type 2B) hopping method, when a discovery signal is transmitted in a discovery period appearing after the aforementioned discovery period, a frequency resource index and a time resource index can be respectively determined by equation 1 described in the following.

next_$nf$=($f$_shift+floor(($nf$+$Nf$*$nt$)/$Nt$))mod $Nf$ next_$nt$=($t$_shift+$nf$+$Nf$*$nt$)mod $Nt$     [Equation 1]

In this case, Nf corresponds to the number of discovery resources per subframe, Nt corresponds to the number of subframes per discovery period, f_shift corresponds to a frequency shift, t_shift corresponds to a subframe shift, nf corresponds to a frequency resource index at which the discovery signal is transmitted, and nt may correspond to a time resource index at which the discovery signal is transmitted.

The f_shift and the t_shift may correspond to values determined by an upper layer parameter (can be signaled via higher layer signaling). The time resource index may correspond to a subframe index of the subframe pool. The frequency resource index corresponds to a frequency resource index included in the resource block pool and a frequency resource corresponding to a frequency resource index may correspond to 2 RBs.

Figure 7:
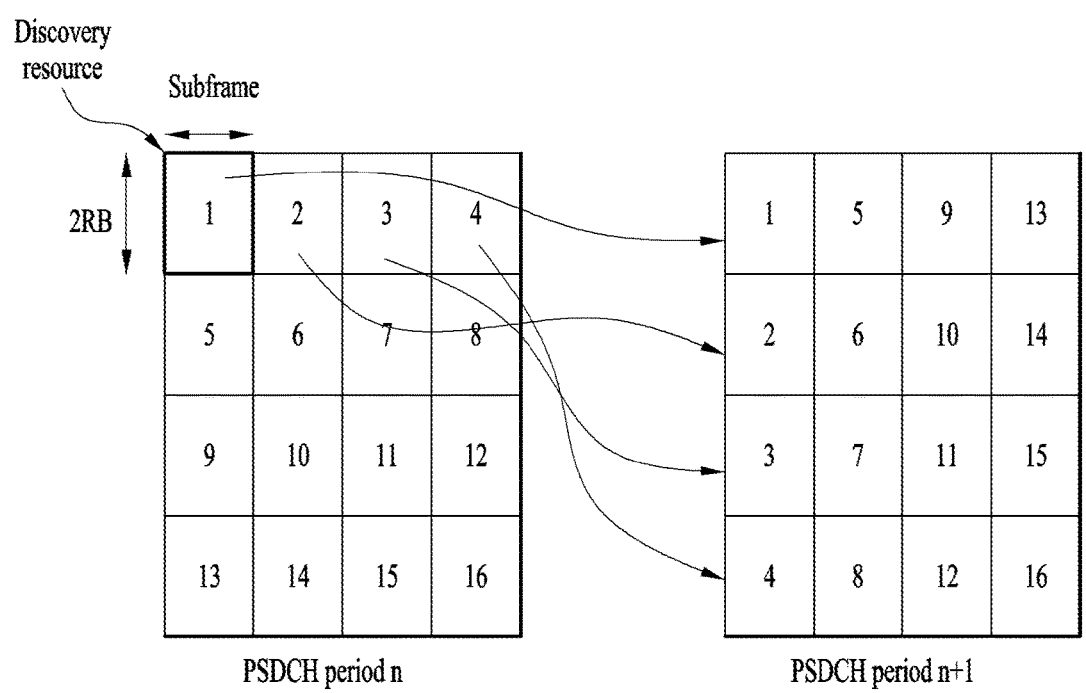

When the indexes are determined based on the equation 1, it may refer to FIG. 7 for hopping. FIG. 7 illustrates hopping performed in a discovery period n and a discovery period n+1. For clarity, assume that Nf=4, Nt=4, t_shift=1, and f_shift=4. Under this assumption, 16 discovery resources in the discovery period n and 16 discovery resources in the discovery period n+1 hop together according to the equation 1. In particular, according to the equation 1, if a time index and a frequency index are switched, it may be able to solve the half-duplex problem.

The t_shift and/or the f_shift can be determined by a cell ID or can be signaled by an upper layer signal. In this case, the t_shift and/or the f_shift can be changed by a cell ID and a period index. For example, the t_shift and/or the f_shift can be configured by a random sequence generator including a cell ID as a seed value and a random sequence can be configured by a value that varies in every discovery period. As a different embodiment of the t_shift and/or the f_shift that changes in every discovery period, the t_shift and/or the f_shift can be configured by a value increasing in every period. In this case, an initial value of the t_shift and/or the f_shift is determined by receiving an upper layer signal from a network and the initial value of the t_shift and/or the f_shift can be configured to be increased in every discovery period. In this case, in order to prevent the value from being excessively increased, it may introduce modulo calculation.

As a different example, when a discovery signal is transmitted in a next discovery period appearing after a discovery period, a frequency resource index and a time resource index can be respectively determined by equation 2 described in the following.

next_$nf$=($nf$+$f$_shift)modulo $Nf$ next_$nt$=($nt$+$nf$+$f$($nt$)+$t$_shift)modulo $Nt$     [Equation 2]

A hopping pattern determined based on the equation 1 or the equation 2 can be applied to both the type 1 and the type 2.

Figure 8:
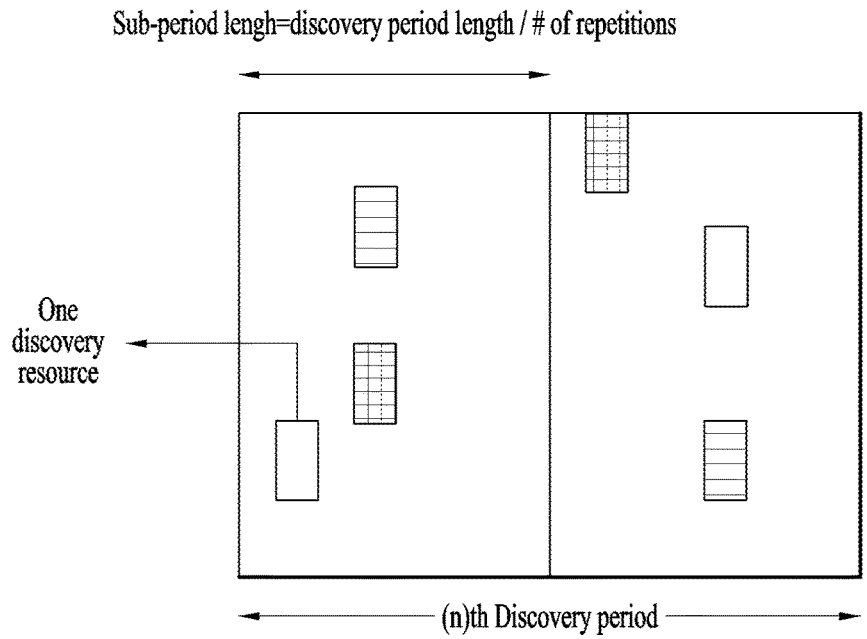

A hopping pattern according to the aforementioned description corresponds to hopping between discovery periods. However, if many transmissions (or repetitive transmission) are permitted in a single discovery period, the single discovery period is divided into a plurality of sub-periods and the discovery period can also be used for hopping between sub-periods. For example, if two transmissions are permitted in a discovery period, as shown in FIG. 8, (n)th discovery period is divided into two sub-periods and the aforementioned hopping pattern can be applied in a unit of a sub-period. In this case, in equations 1 and 2, nt and of correspond to resources in a sub-period and Nt and Nf can be replaced with sizes of a time resource and a frequency resource of a sub-period. However, if a single discovery period includes the considerable number of subframes, the above-mentioned method may increase the burden of a UE. In other word, when a single period is configured by many time resources (e.g., subframes), if a time resource repeated in the period is far away, it is necessary for a UE to store a received signal for a long time. In this case, since it is necessary for the UE to implement a buffer size much larger than that of a cellular system, it may become a big burden in implementing the UE. Therefore, in order to solve the above-mentioned problem, a hopping method related to a sub-period, a method of transmitting a discovery signal using the hopping method, and an apparatus therefor are explained in the following.

Configuration of Sub-Period

According to embodiment of the present invention, a UE determines a size of a sub-period (the size of the sub-period may corresponds to a subframe unit) based on a buffer size within a discovery period and may be able to repeatedly transmit a discovery signal using a hopping pattern applied to the discovery period in a sub-period corresponding to the determined size. In particular, if a size/length of a sub-period is determined in consideration of a buffer size, it may solve the aforementioned problem. In the following description, such a concept as a sub-period group is used as well as the sub-period. The sub-period group corresponds to a set of sub-periods in which repetition is performed.

Figure 9:
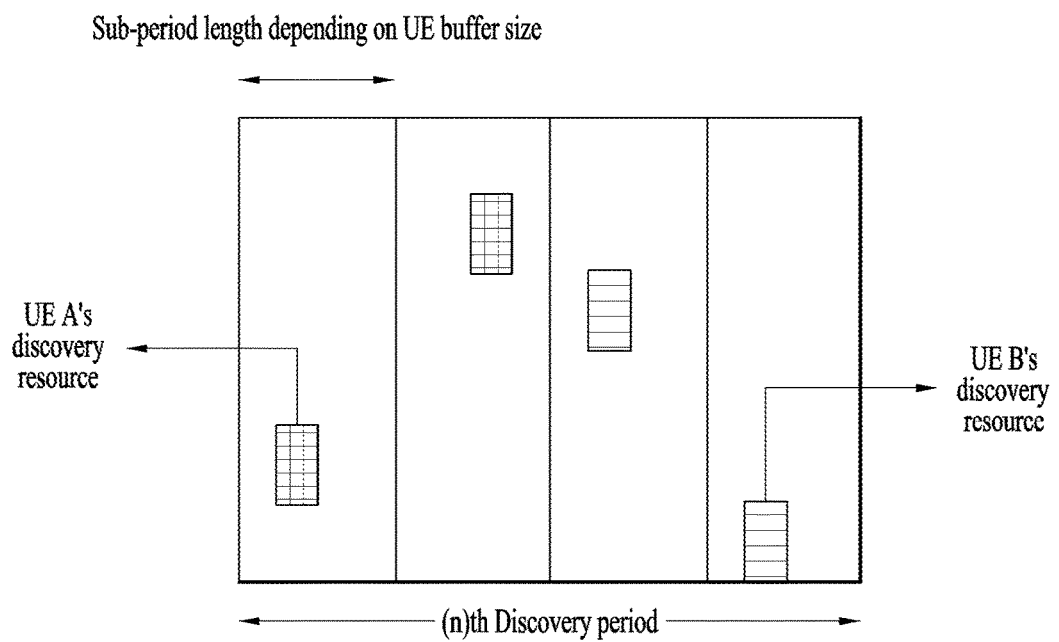

In this case, the size of the sub-period can be pre-configured in consideration of a buffer size. In particular, a length of the sub-period can be determined in advance by a specific value (e.g., 8) in consideration of a UE buffer size. In this case, a length (N) of a single discovery period (subframes) can be divided into floor(N/8) number of sub-periods including 8 SFs. FIG. 9 shows an example for a case that two transmissions are permitted in a discovery period and there are 4 sub-periods. In this case, if a sub-period length is fixed, a part of the sub-periods is not used for discovery transmission and wasted. Hence, as shown in equation 3, it may be able to calculate the number of sub-period groups by considering not only the UE buffer size but also a size of the entire discovery period and the count of performing repetitive transmission (In this case, the repetitive transmission means to transmit the same message by differently configuring a redundancy version only or to transmit code bits for the same message several times (to transmit the same redundancy version)).

floor(period length/(count of performing repetitive transmission*sub-period size)) [Equation 3]

In case of the type 1 discovery, a UE randomly selects a discovery sub-period group or selects a sub-period group by sensing/detecting energy. The UE can randomly select a resource from among the selected sub-period group or selects a resource from among the selected sub-period group by sensing energy.

A different example for determining a size of a sub-period is explained. If a size of a discovery period is not a multiple of a size of a sub-period, a size of the last sub-period included in the discovery period may be different from sizes of sub-periods. In other word, the last discovery sub-period or sub-period group is configured by the number of subframes different from the number of subframes that construct a different sub-period. The size of the sub-period may correspond to a value smaller than the buffer size of the UE receiving the discovery signal.

More specifically, a size of each discovery sub-period is configured by a value related to a predetermined UE buffer size or a UE buffer size for discovery. If a size of the last sub-period is equal to or smaller than a size of a sub-period rather than the last sub-period (e.g., if a size of a discovery resource pool is not a multiple of a size of a sub-period), the last sub-period is configured by subframes more than (or less than) a size of a legacy sub-period. In this case, in equation 1, Nt for the last sub-period or Nt for each sub-period of the last sub-period group can be configured by a value different from a sub-period of a previous sub-period group. FIG. 10 (a) shows a case that one discovery period is configured by a group of two sub-periods and the last sub-period is configured by a size larger than sizes of other sub-periods. FIG. 10 (b) shows a case that the last sub-period is configured by the number of subframes smaller than the number of subframes of other sub-periods. FIG. 10 (c) shows a case that sub-periods of the last sub-period group are configured by the number of subframes smaller than the number of subframes of other sub-period groups.

As a different example of determining a size of a sub-period, it may be able to configure the number of subframes not included in sub-periods of a discovery period to be minimized. In particular, it may be able to configure the number of remaining subframes to be minimized in a period while a size of a sub-period is equal to or less than a UE buffer size for discovery. For example, when a discovery period is configured by 40 subframes, if a length of a sub-period is configured by 8 subframes and the number of repetition is configured by 2, there may exist two sub-period groups and 32 subframes are used in total (8(sub-period length)*2(the number of repetition)*2(the number of sub-period groups)). As a result, the last 8 subframes among the 40 subframes can be wasted without being used. In this case, it may consider two methods. In particular, in order to make the aforementioned case not occur, it may be able to configure a discovery resource pool size or a sub-period size to prevent subframes from being wasted without using the subframes. In the aforementioned embodiment, if a sub-period length is configured by 5 subframes, it may be able to generate 4 sub-period group(s). By doing so, it may be able to use all subframes included in the discovery period.

In the foregoing description, a size of a sub-period can be determined by equation 4 in the following.

$$M' = \underset{M, s.t. 1 \leq M \leq N_{buffer}}{\arg\min} \left( N_p - m \cdot M \cdot \left\lfloor \frac{N_p}{m \cdot M} \right\rfloor \right) \quad \text{[Equation 4]}$$

$N_{buffer}$ corresponds to the number of subframes stored in a buffer, M corresponds to a size of a sub-period, M' corresponds to a size of a determined sub-period, m corresponds to the number of repetition of a discovery signal, and $N^p$ corresponds to the number of subframes included in a discovery period.

If the aforementioned contents are applied to equation 1 or equation 2, a value of the M' is used in equation 1 instead of the Nt. If the M' is set to 1, it indicates that transmission is continuously performed within a period. In this case, in equations 1 and 2, the nt and the of correspond to resources in a selected sub-period and the next_nt and the next_nf correspond to transmission resources in a next sub-period.

According to the aforementioned method, when a sub-period is configured in a resource Np subframe configured for discovery transmission, it may be able to mitigate half duplex constraint while prohibiting buffering equal to or greater than the prescribed number of subframes in consideration of a UE buffer size. And, it may be able to minimize the amount of resources (subframes) wasted in a discovery period. In this case, the M corresponding to the size of the sub-period can be configured by a network via a physical layer signal or an upper layer signal. Along with the present method, it may also use a method of using a subframe of a bigger (smaller) size as the aforementioned last sub-period.

Sub-Period Selection

As mentioned in the foregoing description, due to a UE buffering problem (since there is a limit on a UE buffer size, it is unable to perform buffering on subframes equal to or greater than a certain number), it may be able to configure/ promise that a UE should select contiguous sub-periods.

Specifically, the UE preferentially selects a sub-period group and selects a transmission resource from a first sub-period belonging to the group. The transmission resource selected from the sub-period belonging to the group is determined according to a predetermined (equations 1 and 2) hopping pattern. According to the present method, among UEs, which have selected the same sub-period group, if UEs select a different resource, since a transmission resource is determined by a given hopping pattern in a next sub-period, resource collision does not occur between sub-periods. Yet, a procedure of preferentially selecting a sub-period group is required.

As a different method, a UE randomly selects a sub-period and performs transmission in m number (number of repetition) of contiguous sub-periods appearing after the selected sub-period. In this case, the last m−1 number of sub-periods in a discovery period can be excluded from sub-periods capable of being used for initial transmission.

Discovery Resource Indexing in Discovery Resource Pool

In case of type 2B discovery, if an eNB indicates a specific time/frequency resource in a discovery resource pool, it may be able to determine a resource between periods by the aforementioned hopping pattern equation between discovery periods. In this case, when repetitive transmission is configured in a period, it is necessary to have a mapping rule between a resource configured by a network and a physical resource transmitted during the period. For clarity, a time/frequency resource indicated by the network is referred to as a virtual resource. In the following, a method of configuring a correlation between the virtual resource and a physical resource practically used for transmission is explained.

Figure 11:
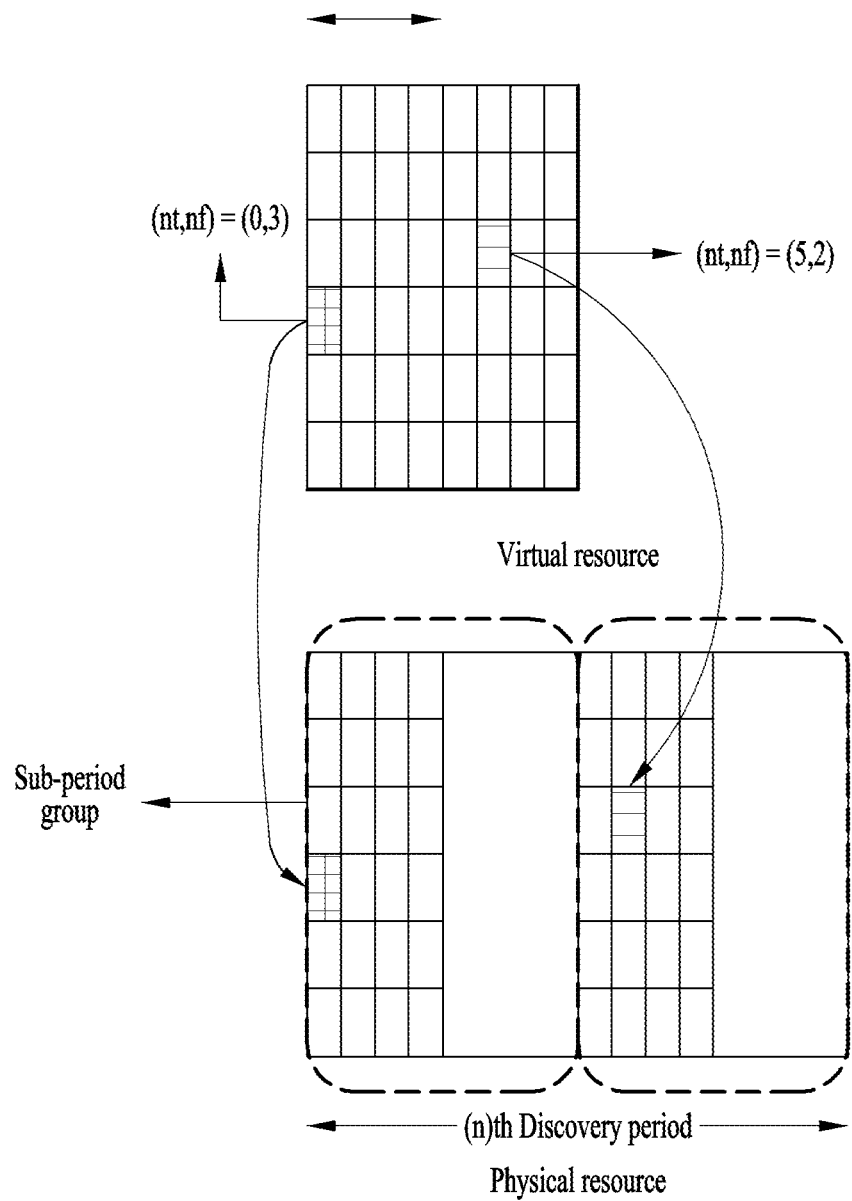

First of all, assume that there are Nt*Nf number of virtual resources in a discovery resource pool. In this case, Nt corresponds to the number of discovery resources in time domain and Nf corresponds to the number of discovery resources in frequency domain. If M number of transmissions is configured within one period, it is necessary to have M*Nt*Nf number of physical resources in total. In this case, a virtual resource can be mapped to a first sub-period set of each sub-period group by one-to-one (1:1). For example, if there are 2 sub-period groups, a physical resource of a first sub-period of each sub-period group is mapped to a virtual resource by 1:1. If the number of discovery resources of a first sub-period in a sub-period group is equal to or greater than the number of virtual discovery resources, a physical resource in the sub-period can be sequentially mapped to a virtual resource by 1:1. FIG. 11 shows an example for a case that Nt=8, Nf=6, and a size of a sub-period group corresponds to 2. Resources of first sub-periods of each sub-period group are mapped to virtual resources by 1:1. In case of type 2 discovery, if an eNB indicates a specific virtual resource, it may be able to naturally determine a sub-period group based on 1:1 relation between the virtual resource and a first physical resource of a repeated discovery signal. According to embodiment of FIG. 11, a second sub-period group is selected from a $25^{th}$ (=4*6+1) discovery resource. In the remaining sub-periods appearing after a first sub-period in a sub-period group, a resource is determined by a hopping pattern equation in the periods. In case of type 1 discovery, a virtual resource is randomly selected (or is selected by sensing/detecting energy) from a discovery resource pool and it may be able to select a sub-period group corresponding to the selected virtual resource and a physical resource in a sub-period in the sub-period group.

The aforementioned contents can be independently implemented or can be implemented in a combined (aggregated) form of a part of the proposed schemes. It may be able to configure an eNB to inform a UE of information on whether to apply the proposed methods (information on rules of the proposed methods) via a predefined signal (e.g., physical layer signal or upper layer signal).

Configurations of Devices for Embodiments of the Present Invention

Figure 12:
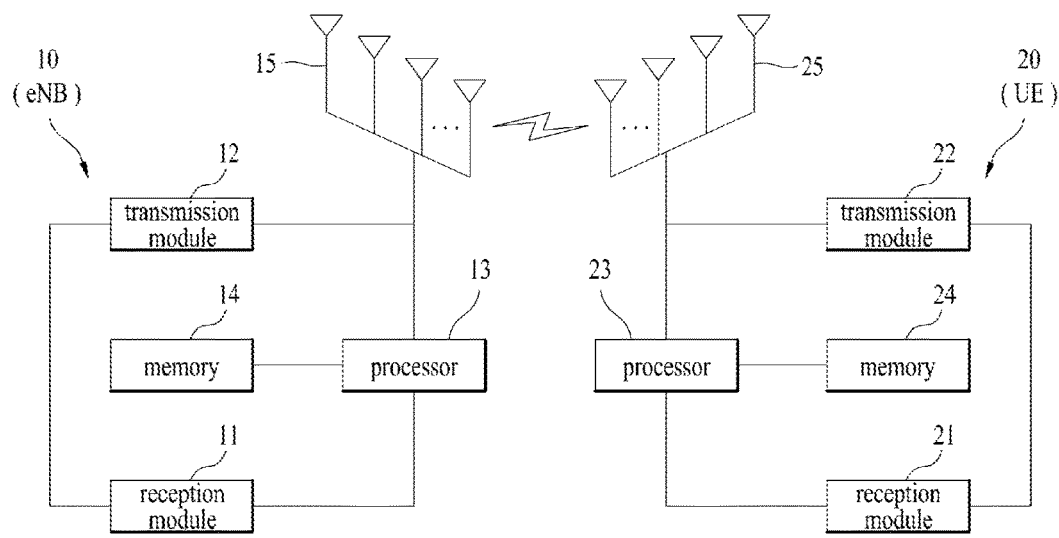
FIG. 12 is a diagram for configurations of a transmitter and a receiver.

FIG. 12 is a diagram illustrating configuration of a transmit point apparatus and a UE according to one embodiment of the present invention.

Referring to FIG. 12, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 12, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 12 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to various mobile communication systems

What is claimed is:

1. A method of transmitting a discovery signal by a device-to-device (D2D) user equipment (UE) in a wireless communication system, the method comprising:
    determining a size of a sub-period, by the D2D UE, based on a buffer size of a D2D UE receiving the discovery signal in a discovery period; and
    transmitting the discovery signal for each of a plurality of sub-periods related with the determined size,
    wherein the discovery period is divided into the plurality of the plurality of sub-periods,
    wherein the size of the sub-period is determined to minimize the number of subframes not contained in any sub-period in the discovery period, and
    wherein the size of the sub-period is determined as follows:

$$M' = \underset{M, s.t. 1 \leq M \leq N_{buffer}}{\arg\min} \left( N_p - m \cdot M \cdot \left\lfloor \frac{N_p}{m \cdot M} \right\rfloor \right),$$

wherein $N_{buffer}$ corresponds to the number of subframes stored in the buffer, wherein M corresponds to a size of a sub-period, wherein M' corresponds to a size of the determined sub-period, wherein m corresponds to the number of repetition of the discovery signal, and wherein $N_P$ corresponds to the number of subframes contained in a discovery period.

2. The method of claim 1, wherein if a size of the discovery period is not a multiple of the sub-period size, a size of a last sub-period contained in the discovery period is different from sizes of sub-periods except the last sub-period.

3. The method of claim 1, wherein the size of the sub-period corresponds to a value smaller than the buffer size of the D2D UE receiving the discovery signal.

4. The method of claim 1, wherein the size of the sub-period corresponds to a value smaller than the buffer size of the D2D UE receiving the discovery signal.

5. The method of claim 1, wherein the discovery signal is transmitted for each of the plurality of sub-periods using a hopping pattern applied to the discovery period, and
    wherein the hopping pattern applied to the discovery period is determined as follows:
    next_nt=(t_shift+nf+Nf*nt) mod Nt
    next_nf=(f—shift+floor((nf+Nf*nt)/Nt)) mod Nf,
    wherein the next_nf and the next_nt respectively correspond to a frequency resource index and a time resource index at which a discovery signal is transmitted in a next discovery period, wherein the Nt corresponds to the number of subframes per discovery period, wherein the f_shift corresponds to a frequency shift, wherein the t_shift corresponds to a subframe shift, wherein the nf corresponds to a frequency resource index at which the discovery signal is transmitted, and wherein the nt corresponds to a time resource index at which the discovery signal is transmitted.

6. The method of claim 5, wherein if the hopping pattern applied to the discovery period is used for the sub-period, the Nt corresponds to the determined size of the sub-period.

7. The method of claim 1, wherein the discovery signal is transmitted for each of the plurality of sub-periods using a hopping pattern applied to the discovery period, and
    wherein the hopping pattern applied to the discovery period is determined as follows:

next_nf=(nf+f_shift) modulo Nf next_nt=(nt+nf+f(nt)+t_shift) modulo Nt, wherein the next_nf and the next_nt respectively correspond to a frequency resource index and a time resource index at which a discovery signal is transmitted in a next discovery period, wherein the Nt corresponds to the number of subframes per discovery period, wherein the f_shift corresponds to a frequency shift, wherein the t_shift corresponds to a subframe shift, wherein the of corresponds to a frequency resource index at which the discovery signal is transmitted, and wherein the nt corresponds to a time resource index at which the discovery signal is transmitted.

8. The method of claim 7, wherein if the hopping pattern applied to the discovery period is used for the sub-period, the Nt corresponds to the determined size of the sub-period.

9. A user equipment transmitting a device-to-device (D2D) signal in a wireless communication system, the user equipment comprising:

a transmitter and a receiver; and a processor configured to:

determine a size of a sub-period based on a buffer size of a UE receiving the discovery signal in a discovery period, and transmit the discovery signal for each of a plurality of sub-periods related with the determined size, wherein the discovery period is divided into the plurality of sub-periods, wherein the size of the sub-period is determined to minimize the number of subframes not contained in any sub-period in the discovery period, and wherein the size of the sub-period is determined as follows:

$$M' = \arg\min_{M, s.t. 1 \leq M \leq N_{buffer}} \left(N_P - m \cdot M \cdot \left\lfloor \frac{N_P}{m \cdot M} \right\rfloor\right),$$

wherein $N_{buffer}$ corresponds to the number of subframes stored in the buffer, wherein M corresponds to a size of a sub-period, wherein M' corresponds to a size of the determined sub-period, wherein m corresponds to the number of repetition of the discovery signal, and wherein $N_P$ corresponds to the number of subframes contained in a discovery period.

* * * * *